W. L. McCABE.
CHUTE.
APPLICATION FILED OCT. 6, 1914.
1,157,019.
Patented Oct. 19, 1915.
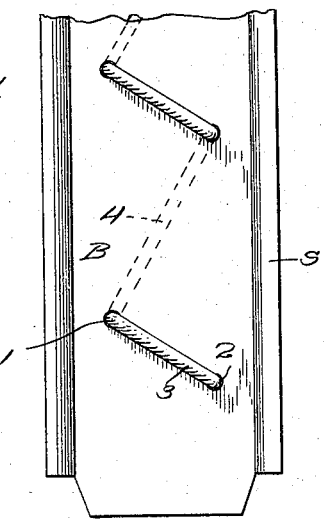
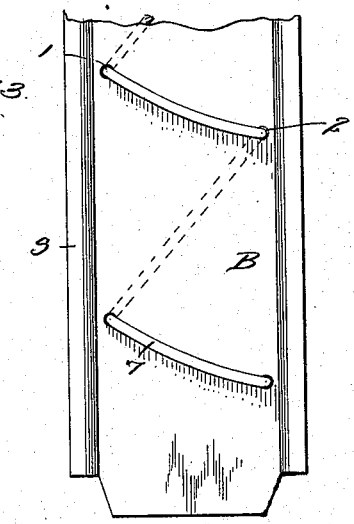
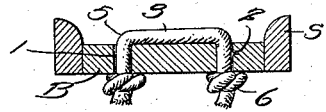
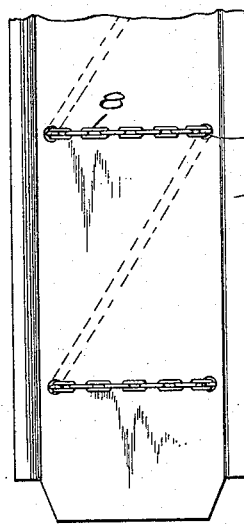
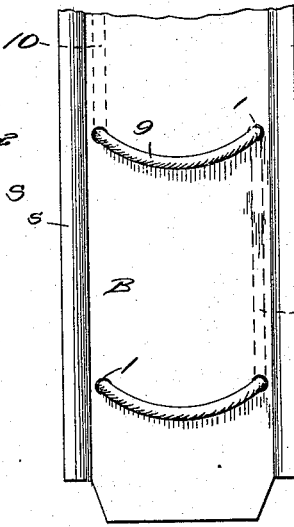
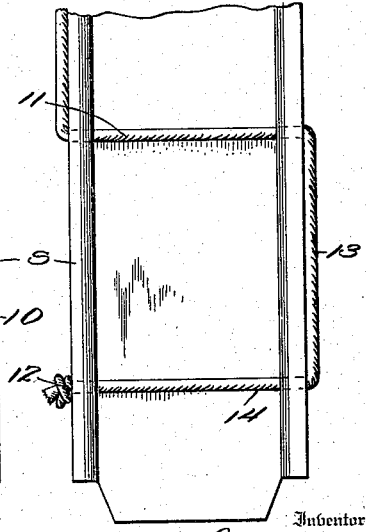

UNITED STATES PATENT OFFICE.

WILLIAM LEGGETT McCABE, OF PORTLAND, OREGON.

CHUTE.

1,157,019.   Specification of Letters Patent.   Patented Oct. 19, 1915.

Application filed October 6, 1914. Serial No. 865,331.

*To all whom it may concern:*

Be it known that I, WILLIAM LEGGETT MC-CABE, a citizen of the United States, residing at Portland, in the county of Multnomah and State of Oregon, have invented certain new and useful Improvements in Chutes; and I do hereby declare the following to be a full, clear, and exact description of the invention, such as will enable others skilled in the art to which it appertains to make and use the same.

This invention relates to conveyers, and more especially to chutes; and the object of the same is to provide means for retarding the speed of articles or materials sliding down a chute. This object is carried out by providing the bottom of the chute with riffles composed of rope, cable, or possibly of chain, in contradistinction to the wooden battens or slats which have hitherto been used.

The following specification sets forth several ways of carrying out the idea, as illustrated in the drawings wherein—

Figure 1 is a plan view of the chute provided with oblique riffles formed of rope rove through holes in the chute. Fig. 2 is a cross section of a similar chute with rope riffles composed of pieces of rope passed through such holes in the bottom of the chute and knotted on the under side of the same. The remaining views are plans of portions of a chute, showing various means for carrying out the same idea. In Fig. 3 a wire cable is employed, rove through holes in the bottom of the chute and with its upper stretches permitted to have a certain slack rather than being drawn taut as in Fig. 1. In Fig. 4 a chain is indicated extending straight across the chute from side to side instead of obliquely across it as in Figs. 1 and 3, and here the chain is illustrated as drawn taut although of course it could be slack. In Fig. 5 is indicated a member which may be rope, cable, or wire, extending straight across the bottom of the chute and its upper stretches quite loose; and this view shows how the lower stretches may be differently disposed. In Fig. 6 the member is drawn straight across the bottom of the chute and its ends pass through the sides of the same.

Chutes for loading or unloading cargo, whether the same be packed in boxes or be handled in bulk like grain, are made of wood or metal and include a bottom B and upright sides S. These chutes are generally employed in lengths, properly supported, with their ends abutting each other or the lower end of an upper section overlying the upper end of the section below; and they incline, usually at a considerable pitch, from the inlet to the outlet end. Assuming that the cargo be ice or corn, it will be seen that if the inclination be sufficient and other conditions are good, the cargo sometimes assumes considerable momentum in traveling down a long chute, and the result is that it often falls off the chute in transit or does damage when it reaches the lower end.

It is the object of the present invention to provide retarding means across or almost entirely across the bottom of the chute, so that the cargo whatever its nature will not move too rapidly, even though the chute be inclined to a quite steep pitch. This object may be carried out in a number of ways, some of which have been shown in the drawings hereto attached.

In Fig. 1 the bottom B of the chute is provided with holes 1 and 2 arranged in staggered relation near the sides S, and a piece of rope 3 is rove through said holes so that its upper stretches lie across the face of the bottom B and its lower stretches 4 underlie the chute as indicated in dotted lines.

In Fig. 2 the same holes 1 and 2 are shown, and the same rope 3 although the latter is here made in short pieces, each end of which is turned downward as at 5 and passed through one of the holes and knotted as at 6 beneath the bottom B. The holes 1 and 2 might not be staggered along the length of the bottom, and if this view be a cross section it will be seen that the upper stretch of the rope lies straight across the face of the chute.

In Fig. 3 a wire cable 7 is illustrated as rove through holes in the same manner as shown in Fig. 2, but here the upper stretches are rather slack so that no one of them is straight between the holes 1 and 2. It is obvious that a slack stretch of rope will have a slightly different effect on the cargo, whether the latter be in bulk or in granular form, than a tightly stretched rope or cable.

In Fig. 4 a chain 8 is shown, and this view illustrates how its upper stretches could extend straight across the bottom B.

In Fig. 5 the member 9 might be a rope, cable, chain, or perhaps even a wire; and this view has been used to show that it could be extremely slack if desired and that its lower stretches 10 could run parallel with the sides S.

These three views, Figs. 3, 4 and 5, show the flexible member as extending quite or almost completely across the face of the bottom B, whereas Figs. 1 and 2 show the upper stretches as leading for only about three-fifths of the distance across the bottom B, leaving narrow paths near the sides S which are unobstructed. I do not wish to be limited in this respect.

Fig. 6 shows still another way in which the idea may be carried out, and herein the member 11 is stretched straight across the bottom B and through the sides S, being knotted or fastened at the outer ends as at 12 in any suitable manner, or perhaps carried down as at 13 and passed back across the bottom as indicated at 14. Here said member will of course extend completely across the full width of the bottom B, and it may lie upon the same or be disposed slightly above the same, and it may extend straight across or obliquely across, as desired. Also it will be clear that one stretch may extend obliquely across the chute in one direction and the next obliquely across in the opposite direction, with or without an interposed stretch which would extend straight across.

The idea is susceptible of a variety of modifications, and as it is quite obvious that the flexible member could be any which will answer the purpose I do not wish to be limited in this respect.

In use, the chute is employed in the customary manner, supported in any way desired, and used in lengths or in one piece. The article or commodity handled may be any which it is desired to have the chute convey. The face of the bottom B and the inner faces of the sides S are smooth, and the holes 1 and 2 may be formed in any suitable manner. When it is found that the cargo passes too rapidly along the chute, this improved retarding device may be applied. If it is in a long piece, it is rove through the holes in any of the ways described or in any suitable way, and its extremities tied or fastened in some manner. If the flexible member is in short pieces, its ends 5 are passed through the holes as seen in Fig. 2 and knotted or otherwise fastened as at 6 to prevent the pieces from becoming lost out. The size of the flexible member and the character thereof will depend upon the usage to which the chute is to be put and the amount of retarding effect it is desired to produce. The cargo or articles are then sent down the chute, and as each one strikes one of the upper stretches of the flexible element it is retarded more or less according to its nature and the nature of the element. If the latter be inclined the cargo is directed toward one edge or side S of the chute, whereas if the flexible element extends straight across the chute—whether taut or loose—a retarding effect is produced without a tendency to deflect the cargo toward one of the sides S. If one of the elements as 3 in Fig. 2 should become worn or broken it can be replaced without stopping the use of the chute. The use of individual pieces or strands may therefore be said to be preferable for this reason, and for the further reason that a piece or stretch could be removed here and there in case it was found that the retarding effect produced was too serious or too severe.

While I have described this invention as applied to a chute and such is my present purpose for its use, it is quite possible to use a retarding device of this or a similar structure in other places where baffles or battens are now commonly employed, and I do not wish to be limited in this respect.

What is claimed as new is:

1. The combination with a chute having holes at intervals therein; of a baffle consisting of a rope rove in and out through said holes with its upper stretches inside the chute and overlying the face of its bottom, and means for holding the rope in place.

2. A baffle for chutes and other inclined elements down which substances are to slide, the same consisting of a flexible member extending across the bottom of said element in stretches with both ends of each stretch connected with the bottom.

3. A baffle for chutes and other inclined elements down which substances are to slide, the same consisting of a rope rove through holes in said element with its upper stretch extending obliquely across the face thereof.

4. The combination with a chute comprising upright sides, and a bottom having holes therein; of a baffle consisting of a flexible member rove through said holes with its upper stretches extending across the face of the bottom and its lower stretches underlying the same.

5. An inclined chute comprising a bottom and upright sides; combined with flexible baffles disposed at intervals along the chute and extending across the face of its bottom and nearly to its sides.

6. A chute comprising a bottom and upright sides; combined with baffles disposed within the chute oblique to its length, overlying the bottom and extending nearly from side to side so as to leave narrow paths past such baffles along the edges of said bottom.

In testimony whereof I affix my signature in presence of two witnesses.

WILLIAM LEGGETT McCABE.

Witnesses:
I. M. PAINTER,
W. L. PAGE.